(12) United States Patent
Ko

(10) Patent No.: US 11,614,280 B2
(45) Date of Patent: Mar. 28, 2023

(54) REFORMING SYSTEM CONNECTED WITH A RAW MATERIAL GAS VAPORIZATION SYSTEM

(71) Applicants: HYUNDAI MOTOR COMPANY, Seoul (KR); KIA MOTORS CORPORATION, Seoul (KR)

(72) Inventor: Dong Seok Ko, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 434 days.

(21) Appl. No.: 16/875,329

(22) Filed: May 15, 2020

(65) Prior Publication Data

US 2021/0140706 A1 May 13, 2021

(30) Foreign Application Priority Data

Nov. 12, 2019 (KR) .................. 10-2019-0144465

(51) Int. Cl.
*F25J 1/00* (2006.01)
*F02M 21/02* (2006.01)
*F17C 5/02* (2006.01)

(52) U.S. Cl.
CPC ........ *F25J 1/0025* (2013.01); *F02M 21/0215* (2013.01); *F02M 21/0218* (2013.01); *F17C 5/02* (2013.01); *F17C 2227/0185* (2013.01); *F17C 2265/033* (2013.01)

(58) Field of Classification Search
CPC ...... F25J 1/0025; F02M 21/0215; F17C 5/02; F17C 2227/0185; F17C 2227/033
See application file for complete search history.

(56) References Cited

U.S. PATENT DOCUMENTS

| 7,135,048 B1* | 11/2006 | Edlund | F17C 7/02 422/112 |
|---|---|---|---|
| 2008/0274021 A1* | 11/2008 | Neels | C01B 3/36 422/198 |
| 2018/0038638 A1* | 2/2018 | Guillard | F25J 1/0225 |
| 2018/0038642 A1* | 2/2018 | Roesch | C01B 3/56 |
| 2018/0038643 A1* | 2/2018 | Roesch | F25J 1/0037 |

FOREIGN PATENT DOCUMENTS

KR 20170011239 A 2/2017

* cited by examiner

*Primary Examiner* — Paul J Gray
(74) *Attorney, Agent, or Firm* — Lempia Summerfield Katz LLC

(57) ABSTRACT

A raw material gas vaporization system includes: a storage tank for storing raw material gas and a transfer line for transferring the raw material gas; a reforming system including a reformer for producing hydrogen by reacting the raw material gas with water, a burner for applying heat to the reformer, and Pressure Swing Adsorption (PSA) for separating the hydrogen in the mixed gas generated from the reformer; a $CO_2$ separation device for receiving off-gas in which the hydrogen has been removed in the mixed gas from the PSA to remove by liquefying $CO_2$ by exchanging heat with the transfer line of the raw material gas vaporization system; and a gas supply line for supplying the remaining gas in which the $CO_2$ has been removed in the $CO_2$ separation device to a burner as fuel.

17 Claims, 6 Drawing Sheets

REFORMING SYSTEM CONNECTED WITH A RAW MATERIAL GAS VAPORIZATION SYSTEM

CROSS REFERENCE TO RELATED APPLICATION

The present application claims priority to Korean Patent Application No. 10-2019-0144465 filed on Nov. 12, 2019, the entire contents of which is incorporated herein for all purposes by this reference.

BACKGROUND OF THE DISCLOSURE

Field of the Disclosure

The present disclosure relates to a reforming system, and more particularly, to a reforming system for removing carbon dioxide in an off-gas stream generated from a reformer connected with a reforming system and a raw material gas vaporization system, thereby enhancing efficiency of the reformer.

Description of the Related Art

Hydrogen may be useful as an energy source or fuel because there is no harmful product to the environment except for a very small amount of nitrogen oxide and because hydrogen may be easily stored in various forms, such as high-pressure gas, liquid gas, and metal hydride. Such technologies have been developed in various fields. A method of producing hydrogen is the most commercialized technology of steam reforming and may produce hydrogen through a reformer by using natural gas, such as town gas, as a raw material. The natural gas reforming is a technology of converting the gas into hydrogen fuel quickly and inexpensively. Additional benefits of the process, which may be a core technology for disseminating a fuel cell, may include high efficiency, miniaturization, lightweight, start-up stability, and speed.

Since a steam reforming reaction is a strong endothermic reaction, it supplies the heat required for reaction by combusting fuel gas in a burner to heat the reformer to a temperature of 750° C. or more. Ultra-high purity hydrogen gas may be generated by Pressure Swing Adsorption (PSA) to purify hydrogen in the gas generated after the steam-methane reforming reaction. The off-gas from the PSA flows into the burner and is used for the heating reaction together with the fuel gas.

Meanwhile, in the case of a storage tank for storing raw material gases such as Liquefied Natural Gas (hereinafter referred to as "LNG") and Liquefied Petroleum Gas (hereinafter referred to as "LPG"), the raw material gases are continuously and naturally vaporized in the storage tank to generate Boil Off Gas (BOG) inside the storage tank. There is a risk of damaging the tank because a pressure of the storage tank rises when the BOG accumulates in the storage tank, such that the BOG generated in the storage tank is treated variously. Various methods of treating the BOG have been disclosed, but a re-liquefiable rate is limited, such that, when the amount of excess BOG is large, the BOG is combusted and consumed.

Conventionally, there has been a problem of combusting the excess BOG to consume the chemical energy of the BOG by the combustion, thereby lowering energy efficiency and wasting energy. Further, there has been a problem in that the above-described off-gas of the PSA contains carbon dioxide ($CO_2$), thereby increasing the energy required for the combustion and increasing the required capacity size of a heat exchanger.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

The present disclosure is intended to solve the above problems. An object of the present disclosure is to provide a reforming system which may remove carbon dioxide ($CO_2$) in the off-gas by liquefying the carbon dioxide by connecting the reforming system with a raw material gas vaporization system, thereby enhancing efficiency of a reformer, and produce hydrogen by using evaporated gas, thereby enhancing efficiency of fuel.

The present disclosure, for achieving the object, may include a raw material gas vaporization system. The system includes: a storage tank for storing raw material gas and a transfer line for transferring the raw material gas; a reforming system including a reformer for producing hydrogen by reacting the raw material gas with water, a burner for applying heat to the reformer, and a Pressure Swing Adsorption (PSA) for separating the hydrogen from the mixed gas generated from the reformer; a $CO_2$ separation device for receiving off-gas in which the hydrogen has been removed in the mixed gas from the PSA to remove by liquefying $CO_2$ by exchanging heat with the transfer line of the raw material gas vaporization system; and a gas supply line for supplying the remaining gas in which the $CO_2$ has been removed in the $CO_2$ separation device to a burner as fuel.

The reforming system may further include a BOG supply line to which Boil Off Gas (BOG) generated by vaporizing the raw material gas stored in the storage tank moves, and the reformer of the reforming system may produce hydrogen by reacting the BOG received from the BOG supply line with water by using the BOG as the raw material gas.

The raw material gas vaporization system may further include a vaporization device for vaporizing the raw material gas heat-exchanged with the off-gas.

The $CO_2$ separation device may include an off-gas compressor for compressing the off-gas discharged from the PSA, and the off-gas compressor may compress a pressure of the off-gas to 20 bar gauge pressure (barg) or more and 30 barg or less.

Further, the $CO_2$ separation device may include a raw material gas-off-gas heat exchanger connected to the transfer line and an off-gas supply line of the raw material gas vaporization system to cool the off-gas by using the cold heat of the raw material gas as refrigerant.

Further, the $CO_2$ separation device may include a $CO_2$ separator for separating the $CO_2$ liquefied in the off-gas or a $CO_2$ tank for storing the liquefied $CO_2$.

Further, when the off-gas exchanges heat with the raw material gas system, the temperature of the off-gas may be cooled to −40° C. or less and −50° C. or more.

The raw material gas vaporization system may include a BOG compressor for compressing the BOG of the storage tank so that the high-pressure BOG flows into the BOG supply line. The system may further include a first pump connected to the storage tank to compress and transmit the raw material gas and a suction drum for re-liquefying a portion of the BOG by flowing the portion of the BOG having passed through the BOG compressor into the BOG supply line and mixing the remainder with the raw material gas transmitted by the first pump. Further, the first pump may compress the raw material gas to 1 barg or more and 10 barg or less.

Further, the reforming system connected with the raw material gas vaporization system may include a second pump connected with the suction drum to compress and transmit the raw material gas having passed through the suction drum to heat-exchange the high pressure raw material gas with the off-gas, and the second pump may compress the raw material gas to 10 barg or more and 100 barg or less.

The reforming system may further include a water supply device for supplying water and a plurality of water heat exchangers for vaporizing by applying heat to the water and supplying the vaporized water to the reformer.

The reforming system may further include a mixed gas heat exchanger for cooling by heat-exchanging the mixed gas having passed through the reformer with coolant. The reforming system may be configured to further include a transformer for producing hydrogen by reacting the CO generated in the reformer.

The present disclosure may reduce the $CO_2$ emission of the off-gas discharged from the reformer of the reforming system to remove the $CO_2$ flowing into the burner, thereby reducing waste of the heat required for heating the $CO_2$. Further, the excess BOG generated in the raw material gas vaporization system may be used to produce the hydrogen rather than combusting and consuming it, thereby enhancing efficiency of the fuel to enhance economy.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
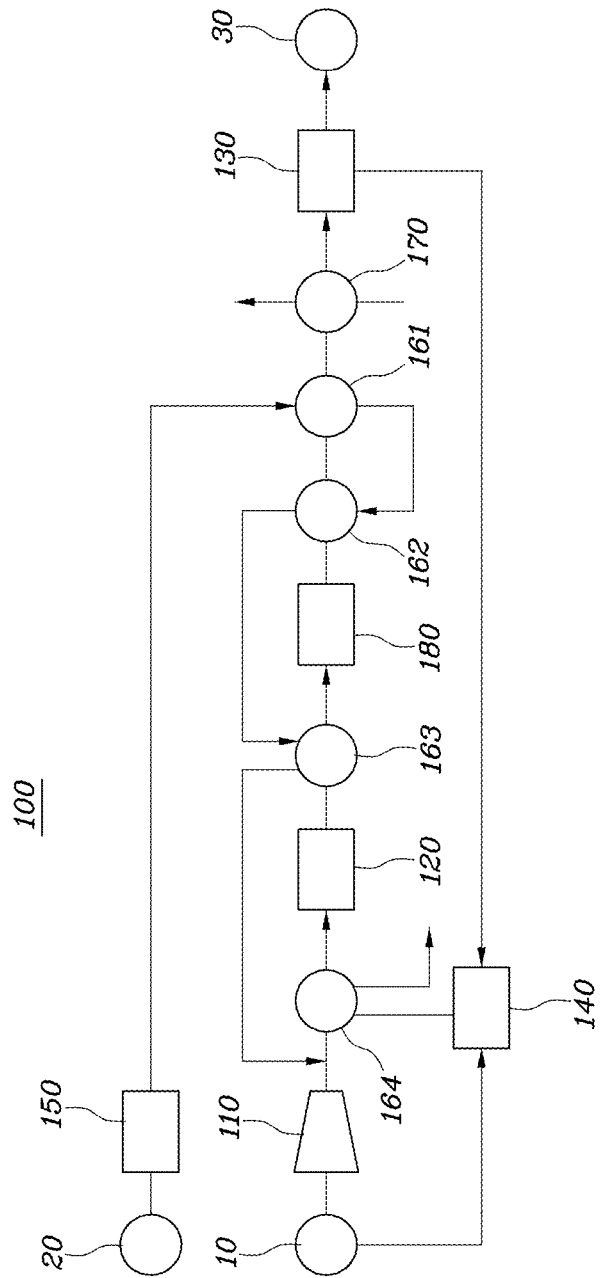
FIG. 1 is a block diagram of a reforming system.

Specific structural and functional descriptions of the embodiments of the present disclosure disclosed in the present specification or application are illustrated only for the purpose of describing the embodiments according to the present disclosure. The embodiments according to the present disclosure may be embodied in various forms and it should not be construed as being limited to the embodiments described in the present specification or application.

Since the embodiments according to the present disclosure may be variously changed and have various forms, specific embodiments are illustrated in the drawings and described in detail in the present specification or application. However, this is not intended to limit the embodiments according to the concept of the present disclosure to a particular disclosed form. It should be understood to include all changes, equivalents, and substitutes included in the spirit and scope of the present disclosure.

Terms such as first and/or second may be used to describe various components, but the components should not be limited by the terms. The terms are used only for the purpose of distinguishing one component from another. For example, without departing from the scope according to the concept of the present disclosure, the first component may be named a second component and, similarly, the second component may be named the first component.

Hereinafter, embodiments of the present disclosure are described with reference to the accompanying drawings to describe the present disclosure in detail. The same reference numerals presented in the drawings denote the same members. Various components, i.e., devices, units, elements, and the like of the present disclosure may be described herein as having a specific purpose or performing a particular function, process, or the like. Such components may be said to be "configured to" achieve or meet the specific purpose or to perform, complete, undertake, or produce the particular function, process, or the like.

The present disclosure relates to a reforming system 100 connected with a raw material gas vaporization system. The reforming system 100 is for producing hydrogen by using Boil Off Gas (BOG) by connecting a raw material gas vaporization system 200 with the reforming system 100. The reforming system 100 thereby enhances economy and, by removing carbon dioxide ($CO_2$) in off-gas, enhancing efficiency of the reforming system 100.

FIG. 1 is a block diagram of the reforming system 100. The general reforming system 100 is briefly described with reference to FIG. 1 as follows.

Referring to FIG. 1, the reforming system 100 may include a raw material gas 10, a raw material gas compressor 110, a reformer 120, a transformer 180, water 20, a water supply device 150, one or more, or a plurality of, heat exchangers 161, 162, 163, 164, and a Pressure Swing Adsorption (PSA) 130. The raw material gas may be composed of various raw material gases that are transferred and vaporized in a liquefied state, such as LNG and LPG.

The reforming system 100 is a system for producing hydrogen 30 by reacting the raw material gas 10 with the water 20. A chemical reaction in the reformer 120 in which a reforming reaction occurs is as follows, where $CH_4$ is methane, $H_2O$ is water, CO is carbon monoxide, and $3H_2$ represents three hydrogen molecules.

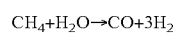

$$CH_4 + H_2O \rightarrow CO + 3H_2$$

A methane-steam reforming reaction is a strong endothermic reaction. Therefore, since the forward reaction occurs actively under a high temperature condition, the reforming system 100 is configured to include a burner 140 for supplying reaction heat to the reformer 120. The conventional reforming system combusts the raw material gas 10, such as town gas and/or off-gas discharged from the PSA 130, as fuel in the burner 140 to supply the reaction heat to the reformer 120. Further, the raw material gas 10 may be Boil Off Gas (BOG) generated by vaporizing the raw material gas 10 that is in a liquid state.

The reforming system 100 produces carbon monoxide together with the hydrogen 30 while hydrocarbons are reformed. Since the carbon monoxide acts as a catalyst poison to a catalyst used in an electrode of a fuel cell stack, the carbon monoxide may be removed. The reaction of removing the carbon monoxide may use a shift reaction, such as the following reaction formula, where $H_2$ represents a single hydrogen molecule.

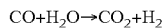

$$CO+H_2O \rightarrow CO_2+H_2$$

Because the conventional reforming system 100 is a configuration for combusting by supplying off-gas to the burner 140, and because the carbon dioxide contained in the off-gas should be heated together, there has been a problem of wasting heat, and there has been a problem in that carbon dioxide is contained in exhaust gas, thereby increasing the required heat capacity of a heat exchanger.

Figure 2:
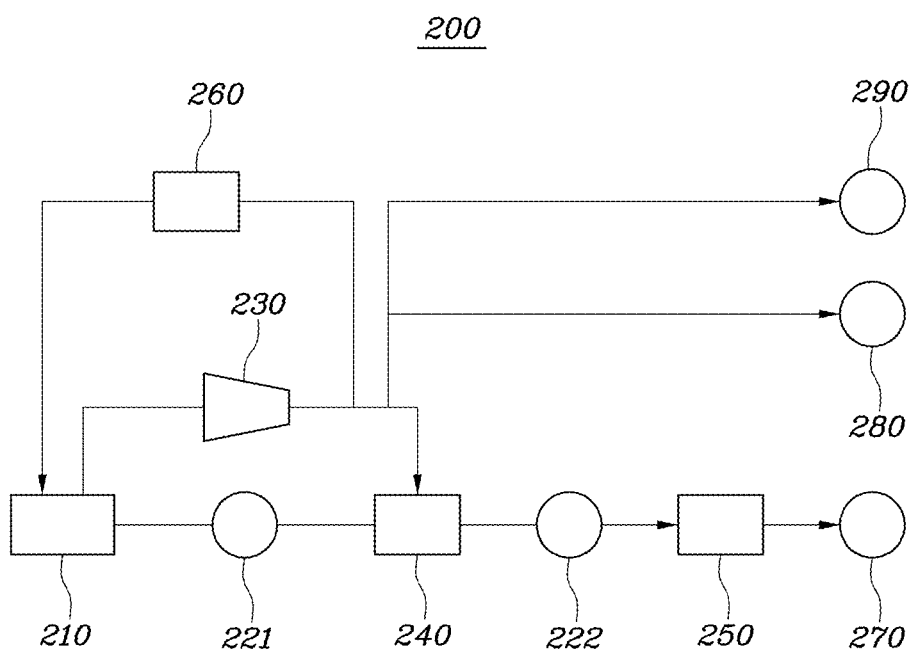
FIG. 2 is a block diagram of a raw material gas vaporization system.

FIG. 2 is a block diagram of the raw material gas vaporization system 200. The general raw material gas vaporization system 200 is briefly described with reference to FIG. 2 as follows.

The raw material gas vaporization system 200 is a system for pressing and vaporizing the raw material gas 10, such as cryogenic LNG of −160° C. or less, to supply the gas 10 to a source of demand 270 that requires energy. The raw material gas vaporization system 200 may include a storage tank 210, a first pump 221, a suction drum 240, a second pump 222, a vaporization device 250, a BOG compressor 230, and a BOG re-liquefaction device 260. The system 200 may process the BOG generated in the storage tank 210.

Though the storage tank 210 may be thermally insulated, external heat may be continuously delivered to the storage tank 210. Thus, the raw material gas 10 is continuously and naturally vaporized in the storage tank 210, thereby generating the BOG in the storage tank 210.

When the BOG accumulates in the storage tank 210, there is a risk of damaging the tank because the pressure of the storage tank 210 rises, such that the BOG generated in the storage tank 210 is variously processed. Representatively, the BOG may be re-liquefied through the re-liquefaction device 260 to recover the BOG to the storage tank 210. In another example, the BOG may be re-liquefied by mixing the BOG with the raw material gas 10 transferred at high pressure through the suction drum 240. In a further example, the BOG may be consumed in a self-generator 280 by using the BOG as fuel for power generation. In the case that the amount of excess BOG is large, the BOG may be combusted and consumed in a combustion device 290.

There has been a problem that combusting and consuming the excess BOG may consume the chemical energy contained in the BOG through the combustion. There has also been a problem of environmental pollution due to a large amount of $CO_2$ generated in the combustion process.

Figure 3:
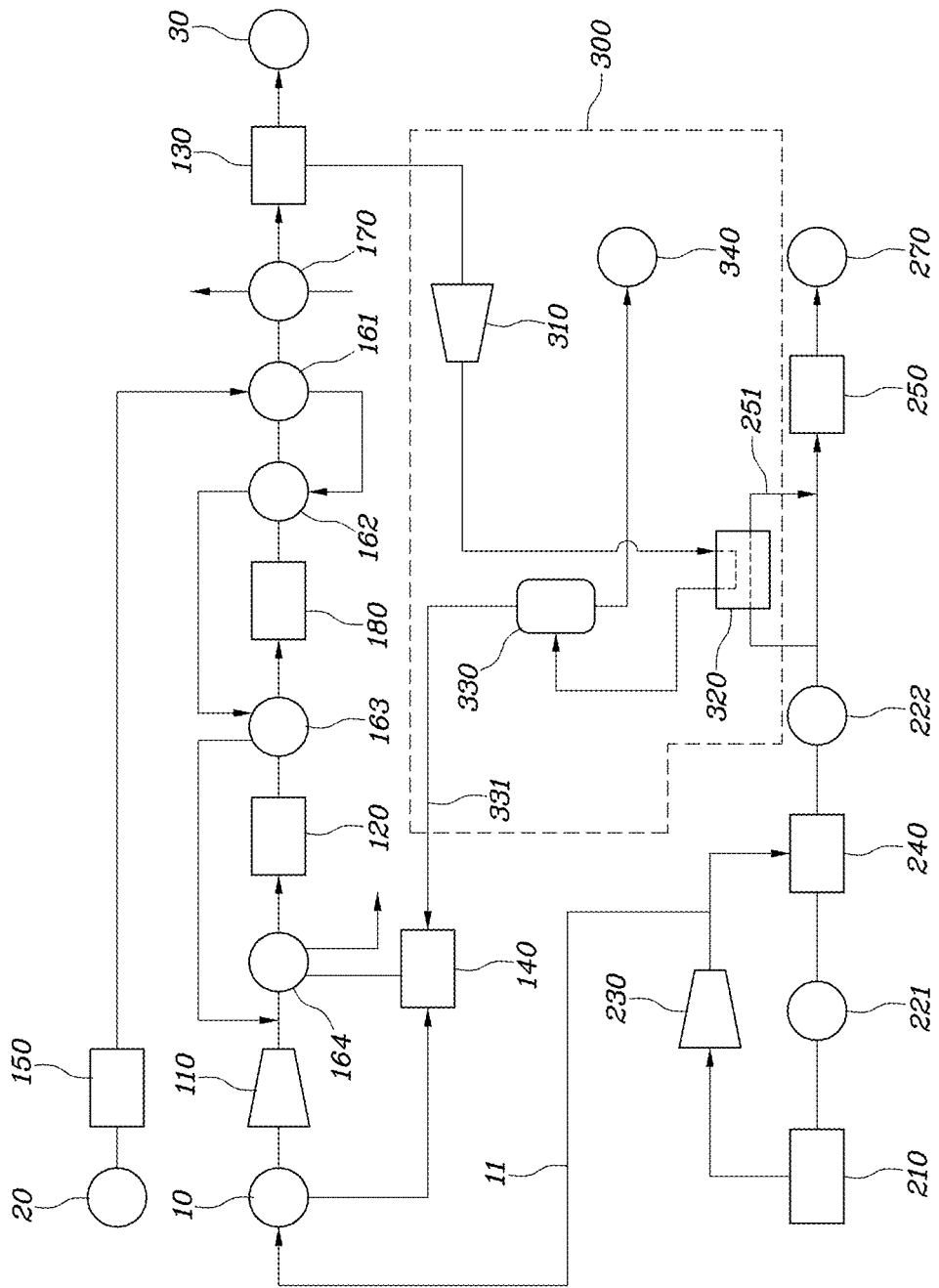
FIG. 3 is a block diagram of a reforming system connected with the raw material gas vaporization system according to an embodiment of the present disclosure.

FIG. 3 is a block diagram of the reforming system connected with the raw material gas vaporization system according to an embodiment of the present disclosure.

Referring to FIG. 3, a reforming system connected with the raw material gas vaporization system according to an embodiment of the present disclosure is depicted. The reforming system of FIG. 3 may include: the raw material gas vaporization system 200, including the storage tank 210 for storing the raw material gas 10 and a transfer line for transferring the raw material gas 10; the reforming system including the reformer 120 for producing the hydrogen 30 by reacting the raw material gas 10 with the water 20, the burner 140 for applying heat to the reformer 120, and the PSA 130 for separating the hydrogen 30 in the mixed gas generated from the reformer 120; the $CO_2$ separation device 300 for removing, though liquification, $CO_2$ by receiving the off-gas in which the hydrogen has been removed in the mixed gas from the PSA 130 to exchange heat with the transfer line of the raw material gas vaporization system 200; and a gas supply line 331 for supplying the remaining gas in which $CO_2$ has been removed in the $CO_2$ separation device 300 to the burner 140 as fuel.

The raw material gas vaporization system according to an embodiment of the present disclosure may remove, through liquification, $CO_2$ in the off-gas generated in the reforming system through a heat exchanger connected with the raw material gas vaporization system. The raw material gas vaporization system may include the $CO_2$ separation device 300 for exchanging heat with the raw material gas vaporization system to liquefy the $CO_2$ contained in the off-gas before combusting by supplying the off-gas discharged from the PSA 130 to the burner 140.

Since the raw material gas 10 in the raw material gas vaporization system is in a cryogenic liquid state until being vaporized, $CO_2$ may be liquefied. To this end, the $CO_2$ separation device 300 may be configured to connect the off-gas discharged from the PSA 130 to the raw material gas vaporization system 200.

Further, the reforming system connected with the raw material gas vaporization system according to an embodiment of the present disclosure may further include a BOG supply line 11 to which the BOG generated by vaporizing the raw material gas 10 stored in the storage tank 210 moves. The reformer 120 of the reforming system may be configured to produce the hydrogen 30 by reacting the BOG received from the BOG supply line 11 with the water 20 by using the BOG as the raw material gas 10.

As described above, because the BOG is generated by vaporizing the raw material gas 10 and is made of hydrocarbons, the hydrogen 30 may be produced by supplying the raw material gas 10 to the reforming system. The BOG generated in the storage tank 210 flows into the reforming system by the BOG supply line 11. The hydrogen 30 may be produced by reforming the received BOG to produce the hydrogen 30 from the BOG, thereby enhancing efficiency of fuel.

The raw material gas vaporization system may further include the BOG compressor 230 for compressing the BOG so that the pressurized (e.g. high-pressure) BOG flows into the BOG supply line 11. The BOG compressor 230 may compress the BOG to 1 barg or more and 10 barg or less.

Further, the raw material gas vaporization system may include a first pump 221 connected with the storage tank 210 to compress and transmit the raw material gas 10, and the suction drum 240 for re-liquefying a portion of the BOG by flowing the portion of the BOG having passed through the BOG compressor 230 into the BOG supply line 11 and mixing the remainder with the raw material gas 10 transmitted by the first pump 221. The suction drum 240 may re-liquefy the BOG by mixing the BOG with the raw material gas 10, thereby enhancing efficiency of fuel. The first pump may compress the raw material gas 10 to 1 barg or more and 10 barg or less.

Further, the raw material gas vaporization system 200 may further include a second pump 222 connected with suction drum 240 to compress and transmit the raw material gas 10 having passed through the suction drum 240 to compress the raw material gas 10 at high pressure. The second pump may compress the raw material gas 10 to 10 barg or more and 100 barg or less.

Further, the raw material gas vaporization system 200 may further include a vaporization device 250 for vaporizing the raw material gas 10 heat-exchanged with the off-gas. The vaporization device 250 may be one of a variety of vaporization devices 250 applied to LNG vaporization. The vaporization device 250 may include a general open rack vaporizer, a submerged combustor, or the like.

The reforming system may include the water supply device 150 for supplying the water 20, and the one or more or the plurality of water heat exchangers 161, 162, 163, 164 for vaporizing by heating the water and supplying the vaporized water to the reformer 120. The water 20 required for the reforming reaction may be pure water or ultrapure water.

Further, the reforming system 100 may be configured to further include a mixed gas heat exchanger 170 for cooling by heat-exchanging the mixed gas having passed through the reformer 120 with coolant. The mixed gas heat exchanger 170 may lower the temperature of the mixed gas heated in the reforming process. The size of the mixed gas heat exchanger 170 is determined according to the amount of the mixed gas discharged from the reformer 120. For example, when the amount of the mixed gases is reduced, the size of the mixed gas heat exchanger 170 may also be reduced.

Further, the reforming system 100 may be configured to further include the transformer 180 for producing the hydrogen by reacting the CO generated in the reformer 120. The transformer 180 is a device for producing the hydrogen 30 by reacting the CO with the water 20, for example, as in the above-described reaction formula, and may produce the hydrogen 30 by removing the CO.

Figure 4:
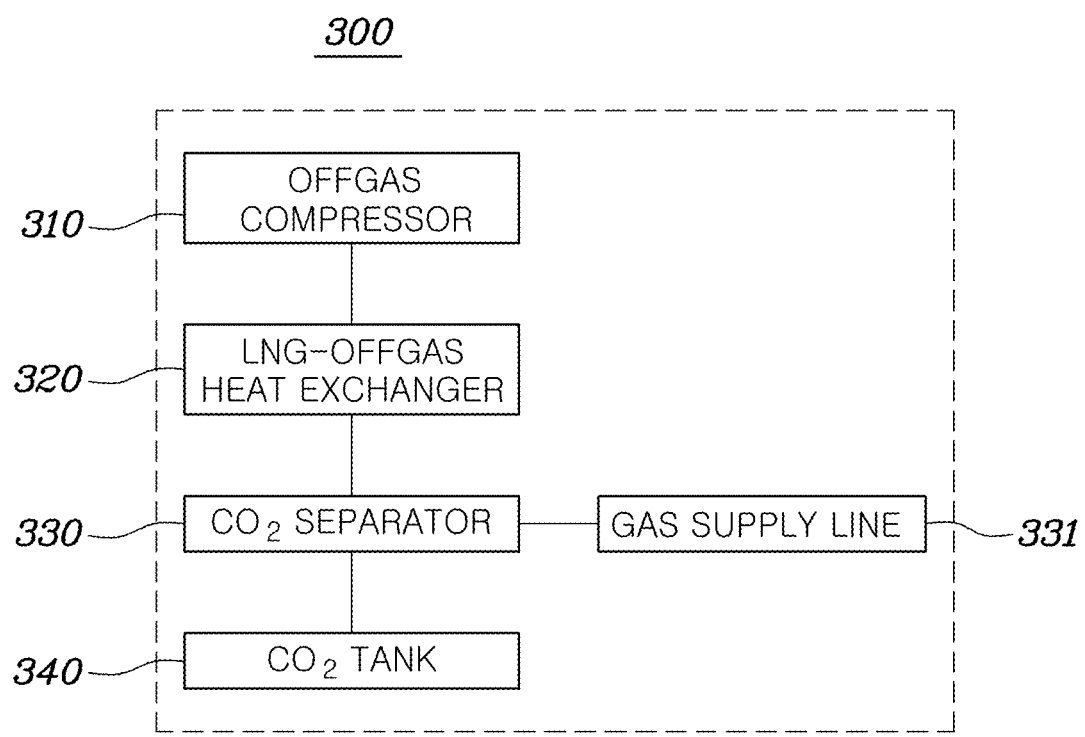
FIG. 4 is a block diagram of a carbon dioxide ($CO_2$) separation device of the reforming system connected with the raw material gas vaporization system according to an embodiment of the present disclosure.
Figure 5:
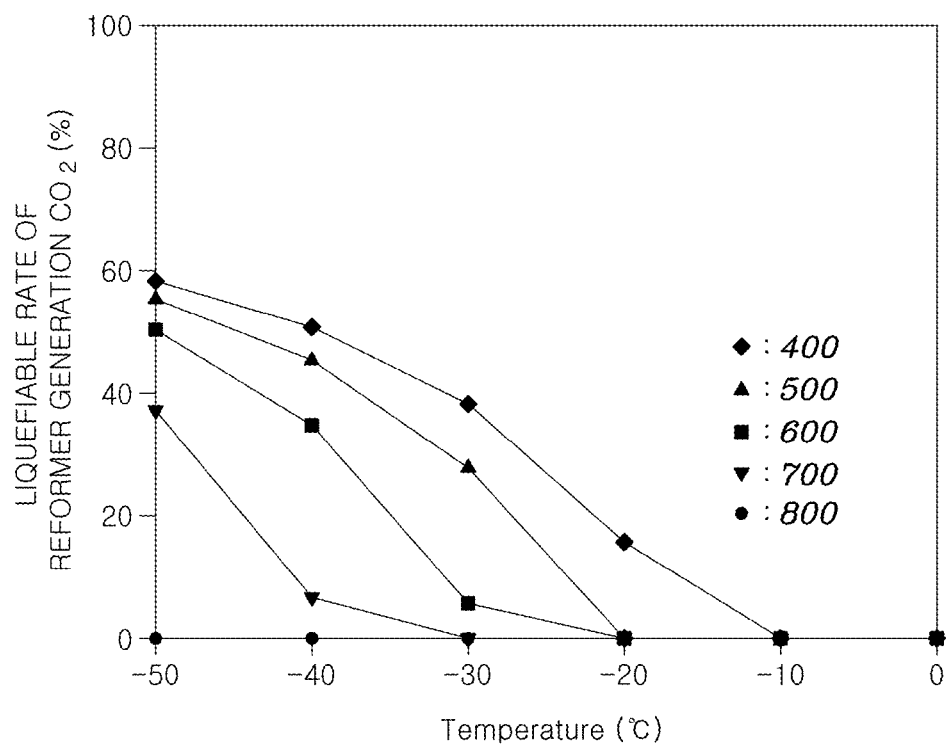
FIG. 5 is a graph illustrating an example liquefiable rate of $CO_2$ according to an environmental condition of the $CO_2$ separation device of the reforming system connected with the raw material gas vaporization system according to an embodiment of the present disclosure.
Figure 6:
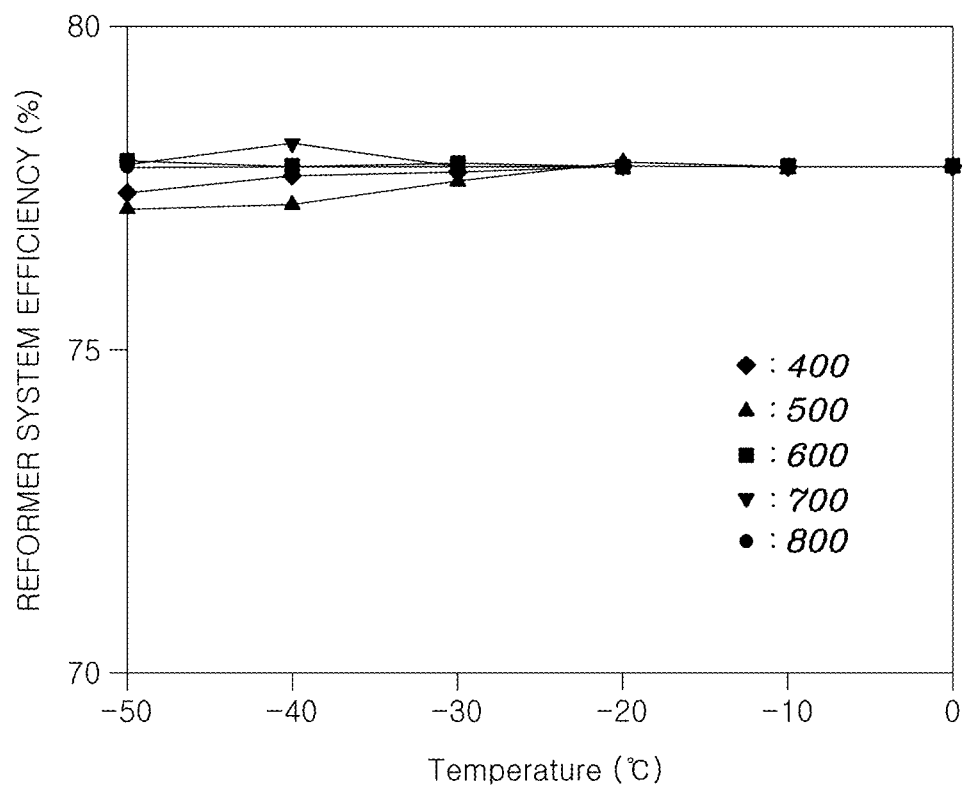
FIG. 6 is a graph illustrating an example efficiency of a reformer system according to the environmental conditions of the $CO_2$ separation device of the reforming system connected with the raw material gas vaporization system according to an embodiment of the present disclosure.

FIG. 4 is a block diagram of the $CO_2$ separation device 300 of the reforming system 100 connected with the raw material gas vaporization system according to an embodiment of the present disclosure. FIG. 5 is a graph illustrating a liquefiable rate of $CO_2$ according to the environmental condition of the $CO_2$ separation device of the reforming system connected with the raw material gas vaporization system according to an embodiment of the present disclosure. FIG. 6 is a graph illustrating an efficiency of the reformer system according to the environmental condition of the $CO_2$ separation device of the reforming system connected with the raw material gas vaporization system according to an embodiment of the present disclosure.

The $CO_2$ separation device 300 is described in detail with reference to FIGS. 4-6 as follows.

The $CO_2$ separation device 300 may include an off-gas compressor 310, a raw material gas and off-gas heat exchanger 320, a $CO_2$ separator 330, and a $CO_2$ tank 340.

Because the $CO_2$ sublimates without passing through the liquid state when cooled at a pressure of a triple point or less, the liquefaction may be performed at a pressure of the triple point or more, and a temperature of the triple point or more. The triple point pressure of $CO_2$ is 4.2 barg and the triple point temperature thereof is $-57.1°$ C. Therefore, the pressure of $CO_2$ in the $CO_2$ separation device 300 may be 4.2 barg or more, and the temperature thereof may be $-57°$ C. or more.

The off-gas compressor 310 is a device for compressing the off-gas discharged from the PSA 130 at high pressure. The off-gas compressor 310 may be connected with the PSA 130 to receive the off-gas.

FIGS. 5 and 6 illustrate the liquefiable rate of $CO_2$ and efficiency of the reformer system according to the pressure having compressed the off-gas in the off-gas compressor 310. Each graph illustrates the liquefiable rate of $CO_2$ and the efficiency of the reformer system when compressed at: 50 barg (data series 400); 40 barg (data series 500); 30 barg (data series 600); 20 barg (data series 700); and 10 barg (data series 800).

Referring to FIG. 5, it may be confirmed that, as the pressure of the off-gas compressed by the off-gas compressor 310 rises, the liquefiable ratio of $CO_2$ increases. The ratio increases because a difference with the triple point pressure of $CO_2$ gradually increases as the pressure rises, thereby increasing the liquefiable temperature region.

Referring to FIG. 6, it may be confirmed that when the pressure of the off-gas exceeds a specific pressure, the efficiency of the reformer system is reduced. As illustrated in FIG. 6, at $-40°$ C., the efficiency of the reformer system at 50 barg (400) appears lower than the efficiency at 30 barg (600) and at 20 barg (700). This is due to the Joule-Thomson effect, in which the off-gas compressed at high pressure is isentropically expanded when passing through a narrow hole while being injected into the burner 140 through the gas supply line 331, thereby reducing the temperature of $CO_2$. Therefore, the pressure of the off-gas after compression may be determined based on the liquefiable rate of $CO_2$ and the efficiency of the reformer system. For example, a pressure of 20 barg or more and 30 barg or less may be determined.

The raw material gas-off-gas heat exchanger 320 exchanges heat between the cryogenic raw material gas 10 and the off-gas.

The raw material gas-off-gas heat exchanger 320 may be connected to the transfer line and the off-gas supply line of the raw material gas vaporization system. Therefore, the raw material gas 10 of the raw material gas vaporization system and the off-gas of the $CO_2$ separation device 300 are heat-exchanged therebetween. The $CO_2$ may be liquefied by cooling the off-gas using the cold heat of the raw material gas 10 as refrigerant.

Referring to FIGS. 5 and 6, when the off-gas exchanges heat with the raw material gas vaporization system, the lower the cooling temperature of the off-gas, the higher the liquefiable rate of $CO_2$ and the efficiency of the reformer. However, referring to FIG. 6, when the cooling temperature of the off-gas is at or below a specific threshold temperature, the efficiency of the reformer system may reduce. Therefore, the off-gas should be cooled at an appropriate temperature determined based on the liquefiable rate of $CO_2$ and the efficiency of the reformer system. For example, the off-gas cooling temperature may be a temperature of $-40°$ C. or less and $-50°$ C. or more.

As a result, when considering the liquefiable rate of $CO_2$ and the efficiency of the reformer system with reference to FIGS. 5 and 6, operating conditions of the $CO_2$ separation device 300 may be determined in one example as a pressure of 20 barg or more and less than 30 barg, and a cooling temperature of $-40°$ C. or less and $-50°$ C. or more.

The $CO_2$ separator 330 is a device for separating the liquefied $CO_2$ after the off-gas exchanges heat with the raw material gas vaporization system to liquefy the $CO_2$. The $CO_2$ tank 340 is a device for storing the $CO_2$ liquefied in the off-gas. The $CO_2$ separated and liquefied in the off-gas may be advantageously separately managed by the $CO_2$ separator 330 and the $CO_2$ tank 340.

The raw material gas vaporization system according to an embodiment of the present disclosure may remove the $CO_2$ of the off-gas, thereby reducing the $CO_2$ emission of the reformer 120. For example, the $CO_2$ emission of the reformer 120 may be reduced by 45%. Further, because the amount of exhaust gases of the burner 140 is reduced by removing the $CO_2$, the size of the mixed gas heat exchanger 170 may be reduced. For example, the size of the mixed gas heat exchanger 170 may be reduced by 9%. Further, the excess BOG may be used to produce the hydrogen 30 without combusting and consuming it, thereby enhancing efficiency of fuel.

While the present disclosure has illustrated and described specific embodiments, it should be apparent to those having ordinary skill in the art that the present disclosure may be variously improved and modified without departing from the technical spirit of the present disclosure provided by the following claims.

What is claimed is:

1. A system including a reforming system connected with a raw material gas vaporization system, the system comprising:
the raw material gas vaporization system comprising a storage tank for storing a raw material gas and a transfer line for transferring the raw material gas;
the reforming system comprising a reformer for producing hydrogen by reacting the raw material gas with water, a burner for applying heat to the reformer, and a Pressure Swing Adsorption (PSA) for separating the hydrogen in a mixed gas generated from the reformer;
a carbon dioxide ($CO_2$) separation device for removing $CO_2$ from received off-gas, from which the hydrogen has been removed in the mixed gas from the PSA by liquefying $CO_2$ by exchanging heat with the transfer line of the raw material gas vaporization system; and
a gas supply line for supplying a remaining gas, from which the $CO_2$ has been removed in the $CO_2$ separation device, to a burner as fuel,
wherein the $CO_2$ separation device comprises a raw material gas-off-gas heat exchanger connected to the transfer line and an off-gas supply line of the raw material gas vaporization system to cool the off-gas by using the cold heat of the raw material gas as refrigerant.

2. The system according to claim 1,
wherein the reforming system further comprises a Boil Off Gas (BOG) supply line to which BOG, generated by vaporizing the raw material gas stored in the storage tank, moves, and
wherein the reformer of the reforming system produces hydrogen by reacting the BOG received from the BOG supply line with water by using the BOG as the raw material gas.

3. The system according to claim 1,
wherein the raw material gas vaporization system further comprises a vaporization device for vaporizing the raw material gas heat-exchanged with the off-gas.

4. The system according to claim 1,
wherein the $CO_2$ separation device comprises an off-gas compressor for compressing the off-gas discharged from the PSA.

5. The system according to claim 4,
wherein the off-gas compressor compresses a pressure of the off-gas to 20 barg or more and 30 barg or less.

6. The system according to claim 1,
wherein the $CO_2$ separation device comprises a $CO_2$ separator for separating the $CO_2$ liquefied in the off-gas.

7. The system according to claim 1,
wherein the $CO_2$ separation device comprises a $CO_2$ tank for storing the liquefied $CO_2$.

8. The system according to claim 1,
wherein, when the off-gas exchanges heat with the raw material gas system, the temperature of the off-gas is cooled to −40° C. or less and −50° C. or more.

9. The system according to claim 1,
wherein the system further comprises a water supply device for supplying water and a plurality of water heat exchangers for vaporizing by applying heat to the water and supplying the vaporized water to the reformer.

10. The system according to claim 1,
wherein the system further comprises a mixed gas heat exchanger for cooling by heat-exchanging the mixed gas having passed through the reformer with coolant.

11. The system according to claim 1,
wherein the system further comprises a transformer for producing hydrogen by reacting the CO generated in the reformer.

12. A system comprising:
a raw material gas vaporization system comprising a storage tank for storing a raw material gas and a transfer line for transferring the raw material gas;
a system connected with the raw material gas vaporization system and comprising a reformer for producing hydrogen by reacting the raw material gas with water, a burner for applying heat to the reformer, and a Pressure Swing Adsorption (PSA) for separating the hydrogen in a mixed gas generated from the reformer;
a carbon dioxide ($CO_2$) separation device for removing $CO_2$ from received off-gas, from which the hydrogen has been removed in the mixed gas from the PSA, by liquefying $CO_2$ by exchanging heat with the transfer line of the raw material gas vaporization system; and
a gas supply line for supplying a remaining gas, from which the $CO_2$ has been removed in the $CO_2$ separation device, to a burner as fuel,
wherein the raw material gas vaporization system further comprises a Boil Off Gas (BOG) compressor for compressing BOG of the storage tank so that the high-pressure BOG flows into the BOG supply line.

13. The system according to claim 12,
wherein the raw material gas vaporization system further comprises a first pump connected with the storage tank to compress and transmit the raw material gas and a suction drum for re-liquefying a portion of the BOG by flowing the portion of the BOG having passed through the BOG compressor into the BOG supply line and mixing the remainder with the raw material gas transmitted by the first pump.

14. The system according to claim 13,
wherein the first pump compresses the raw material gas to 1 barg or more and 10 barg or less.

15. The system according to claim 13, further comprising a second pump connected with the suction drum to compress and transmit the raw material gas having passed through the suction drum to heat-exchange the high-pressure raw material gas with the off-gas.

16. The system according to claim 15,
wherein the second pump compresses the raw material gas to 10 barg or more and 100 barg or less.

17. A system comprising:
a raw material gas vaporization system comprising a storage tank for storing a raw material gas and a transfer line for transferring the raw material gas;
a system connected with the raw material gas vaporization system and comprising a reformer for producing hydrogen by reacting the raw material gas with water, a burner for applying heat to the reformer, and a Pressure Swing Adsorption (PSA) for separating the hydrogen in a mixed gas generated from the reformer;

a $CO_2$ separation device for removing $CO_2$ from received off-gas which the hydrogen has been removed in the mixed gas from the PSA by liquefying carbon dioxide (CO2) by exchanging heat with the transfer line of the raw material gas vaporization system; and a gas supply line for supplying a remaining gas, from which the $CO_2$ has been removed in the $CO_2$ separation device, to a burner as fuel, wherein the system further comprises a Boil Off Gas (BOG) supply line to which BOG, generated by vaporizing the raw material gas stored in the storage tank, moves, and wherein the reformer of the system produces hydrogen by reacting the BOG received from the BOG supply line with water by using the BOG as the raw material gas.

* * * * *